United States Patent [19]

Furusawa et al.

[11] Patent Number: 5,778,745
[45] Date of Patent: Jul. 14, 1998

[54] CHIP-BROKEN TURNING METHOD AND APPARATUS

[75] Inventors: Yoshinori Furusawa, Takarazuka; Yoshihiro Ikemoto, Hirakata; Koji Fujimoto, Toyono-gun; Koji Nakagawa, Minamikawachi-gun; Toshifumi Miyake; Toshikazu Shogase, both of Ozu, all of Japan

[73] Assignee: Matsushita Electric Industrial Co., Ltd., Osaka-fu, Japan

[21] Appl. No.: 803,367

[22] Filed: Feb. 20, 1997

[30] Foreign Application Priority Data

Feb. 21, 1996 [JP] Japan .................................. 8-033351
Aug. 6, 1996 [JP] Japan .................................. 8-206787

[51] Int. Cl.[6] ........................................................ B23B 3/00
[52] U.S. Cl. ................................ 82/1.11; 82/904; 451/28
[58] Field of Search ............................ 82/904, 1.11, 118,
82/137, 134, 158, 132, 133, 105; 451/28,
8, 9, 10, 11; 407/17

[56] References Cited

U.S. PATENT DOCUMENTS

| | | | |
|---|---|---|---|
| 4,296,657 | 10/1981 | Yasuba et al. | 82/1.11 |
| 4,667,546 | 5/1987 | Dombrowski et al. | 82/904 |
| 4,683,788 | 8/1987 | Kronawittleithner et al. | 82/904 |
| 4,693,146 | 9/1987 | Dombrowski et al. | 82/904 |
| 4,848,198 | 7/1989 | Royal et al. | 82/1.11 |
| 5,019,115 | 5/1991 | Schneider et al. | |
| 5,113,728 | 5/1992 | Medeksza . | |
| 5,152,202 | 10/1992 | Strauss | 82/904 |
| 5,291,812 | 3/1994 | Yen et al. | 82/904 |
| 5,331,870 | 7/1994 | Chin-Long | 82/904 |
| 5,361,470 | 11/1994 | Hamada et al. | 82/1.11 |
| 5,417,130 | 5/1995 | Dorsch | 82/1.11 |
| 5,485,771 | 1/1996 | Brennan et al. | 82/1.11 |
| 5,655,423 | 8/1997 | Nishio et al. | 82/1.11 |

FOREIGN PATENT DOCUMENTS

94/23869  10/1994  WIPO .

OTHER PUBLICATIONS

Publication before Scientific Conference at 1967' Spring Meeting of Seiki-gakkai "Chip Cutting by Vibration Feeding" by Kenkyusho et al. (partial English Translation).

Primary Examiner—Timothy V. Eley
Assistant Examiner—Derris H. Banks
Attorney, Agent, or Firm—Wenderoth, Lind & Ponack, L.L.P.

[57] ABSTRACT

With a device for reciprocating a cutting tool in small steps, the cutting tool is reciprocated in small steps in such a way that a feed mark (track of the cutting tool on the workpiece) is inverted each time the workpiece makes a round, by which the chip is varied in width and cut at a track crossing portion during the machining. Thus, chips are broken into short pieces so that the cutting efficiency and the cutting quality are improved and that the chip disposal is facilitated. Moreover, a safe turning process can be achieved.

8 Claims, 11 Drawing Sheets

CHIP-BROKEN TURNING METHOD AND APPARATUS

BACKGROUND OF THE INVENTION

The present invention relates to turning process and apparatus and, more particularly, to a type of machining in which a chip is broken by reciprocating the cutting tool.

As an equipment for making chips broken into pieces of appropriate lengths from the chip disposal point of view, there have been provided, for example, lathes using a chip breaker.

A cutting process of the flank-obstructing type, which is most frequent in actual turning work, is implemented with an arrangement in which a chip breaker is mounted on a cutting tool as shown in FIG. 17.

A turning chip 16 is generated from the process of turning or cutting a rotating workpiece 7 with an edge of the cutting tool 3 held in contact with the workpiece 7. The turning chip 16, although tending to flow out along the cutting face of the cutting tool 3, will strike the chip breaker 15 so as to curl upward. When the chip has struck the bottom surface of the cutting tool 3, a distortion then developed to the surface, if larger than the breaking distortion of the chip material of the workpiece 3, would cause the chip to be bent and broken.

However, when such a conventional cutting tool equipped with a chip breaker is used to cut an object material having high ductility, such as iron, non-ferrous metals and resins, large break distortions would be caused, making it difficult even for the chip breaker to break chips.

Therefore, due to elongated continuous chips, the following issues are incurred:

1. As to machining:

1) The chip would be entangled with the cutting tool, deteriorating the machinability;

2) The chip would strike the machining surface, causing the machining surface to be damaged; and 3) The chip would be sandwiched between a chuck and the workpiece, causing a mis-chucking.

These issues would result in deteriorations in the cutting efficiency and cutting quality.

2. As to chip disposal:

1) The chip would be so large in volume as to be caught in a hole on the way to the chip tray in a lathe or the like such that it will not easily fall on the tray.

2) Even if the chip has fallen on the tray, the tray will soon be filled with chips. As a result, chip disposal would be difficult so that much time is taken for the elimination of the chips.

Further, high speed continuous chips would fly out such that the operator may be injured or that the machine may be damaged as another issue.

SUMMARY OF THE INVENTION

Therefore, an object of the present invention is to provide a turning method and a turning apparatus which reduce the size of chips, thereby improving cutting efficiency as well as cutting quality and facilitating chip disposal, and moreover which are of safety, for the turning process of object materials that have difficulty in breaking chips.

An object of the present invention is therefore to provide a turning method and a turning apparatus which reduce the size of chips, thereby improving cutting efficiency as well as cutting quality and facilitating chip disposal, and moreover which are of safety and high surface roughness and roundness, for the turning process, such as finish turning process, to which a surface roughness and a roundness are required and which are applied to object materials having difficulty in breaking chips.

In accomplishing these and other aspects, according to a first aspect of the present invention, there is provided, in a turning method for machining a workpiece with a cutting tool, a turning method with reciprocation of a cutting tool comprising:

transferring a table on which a cutting tool is mounted, in a direction along a surface to be machined, thereby machining a workpiece;

during the transferring and machining process, reciprocating the cutting tool in small steps in the direction along which the table is transferred; and varying a chip width of a chip by inverting a feed mark at each one round of the workpiece while the cutting tool is reciprocated in the small steps at a frequency m/2 times (where m is any odd number) higher than a rotational speed N (rps) of the workpiece, so that the feed mark crosses itself and thus the cutting tool will pass a portion that has already been cut to break the chip at the portion.

According to a second aspect of the present invention, there is provided a turning method as defined in the first aspect, wherein the cutting tool has a flattened cutting edge.

According to a third aspect of the present invention, there is provided, in a turning method for machining a workpiece with a cutting tool, a turning method with reciprocation of a cutting tool comprising:

transferring a table on which a cutting tool is mounted, in a direction along a surface to be machined, thereby machining a workpiece;

during the transferring and machining process, reciprocating the cutting tool in small steps in the direction along which the table is transferred; and varying a chip width of a chip by inverting a feed mark at each one round of the workpiece while the cutting tool is reciprocated in the small steps at a frequency m/2 times (where m is any odd number) higher than a rotational speed N (rps) of the workpiece, and breaking a chip at a feed mark crossing portion thereof, wherein the cutting tool used is one having a flattened cutting edge.

According to a fourth aspect of the present invention, there is provided a turning method as defined in the third aspect, wherein in varying the chip width, the feed mark crosses itself and thus the cutting tool will pass a portion that has already been cut to break the chip at the portion.

According to a fifth aspect of the present invention, there is provided, in a turning apparatus for machining a rotating workpiece with a cutting tool, a turning apparatus comprising:

a device for reciprocating a cutting tool in small steps with respect to a workpiece;

a movable table on which the cutting-tool small-step reciprocating device is mounted; and a drive signal generating means for driving the cutting-tool small-step reciprocating device to reciprocate the cutting tool in small steps in a direction along which the table is moved so as to vary a chip width of a chip by inverting a feed mark at each one round of the workpiece while the cutting tool is reciprocated in the small steps at a frequency m/2 times (where m is any odd number) higher than a rotational speed N (rps) of the workpiece, so that the feed mark crosses itself and thus the cutting tool will pass a portion that has already been cut to break the chip at the portion.

According to a sixth aspect of the present invention, there is provided a turning apparatus as defined in the fifth aspect, wherein the cutting tool has a flattened cutting edge.

According to a seventh aspect of the present invention, there is provided, in a turning apparatus for machining a rotating workpiece with a cutting tool, a turning apparatus comprising:

a device for reciprocating a cutting tool in small steps with respect to a workpiece;

a movable table on which the cutting-tool small-step reciprocating device is mounted; and a drive signal generating means for driving the cutting-tool small-step reciprocating device to reciprocate the cutting tool in small steps in a direction along which the table is moved, wherein the cutting tool has a flattened cutting edge.

According to an eighth aspect of the present invention, there is provided a turning apparatus as defined in the seventh aspect, wherein the drive signal generating means drives the cutting-tool small-step reciprocating device to reciprocate the cutting tool in small steps in a direction along which the table is moved so as to vary a chip width of a chip by inverting a feed mark at each one round of the workpiece while the cutting tool is reciprocated in the small steps at a frequency m/2 times (where m is any odd number) higher than a rotational speed N (rps) of the workpiece, so that the feed mark crosses itself and thus the cutting tool will pass a portion that has already been cut to break the chip at the portion.

According to the above arrangements of the aspects, as a result, chips are broken short, so that the cutting efficiency and the cutting quality are improved, the chip disposal is facilitated, and that a safe turning process can be achieved.

BRIEF DESCRIPTION OF THE DRAWINGS

These and other aspects and features of the present invention will become clear from the following description taken in conjunction with the preferred embodiments thereof with reference to the accompanying drawings, in which.

DETAILED DESCRIPTION OF THE PREFERRED EMBODIMENTS

Figure 1:
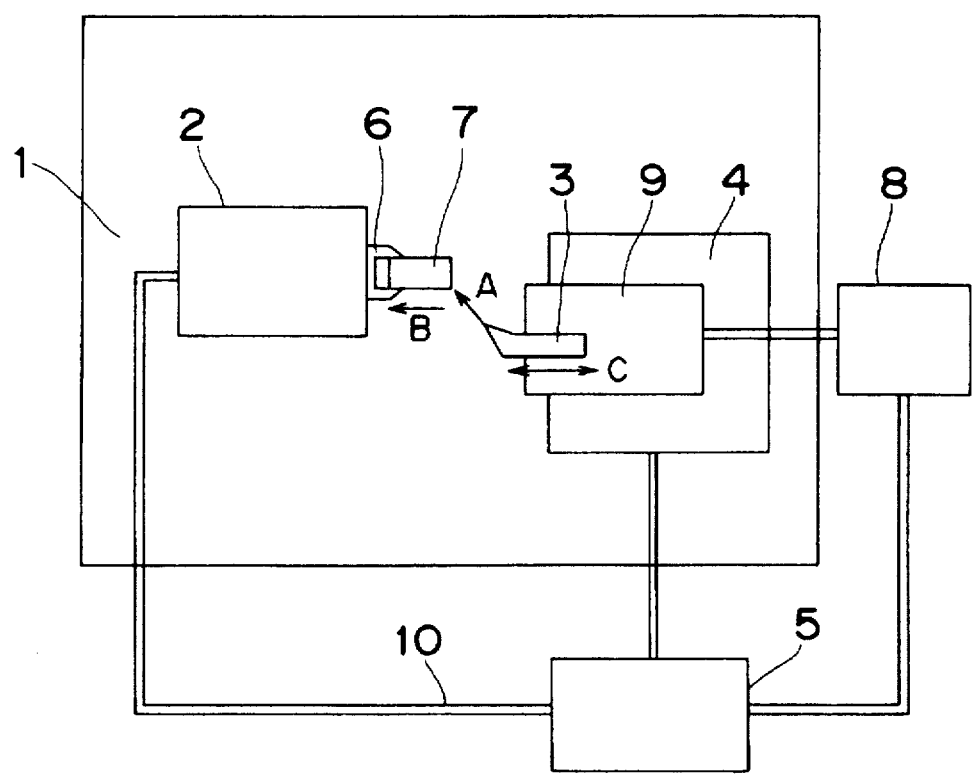
FIG. 1 is a plan view of a chip-broken turning apparatus according to a first embodiment of the present invention.

Before the description of the present invention proceeds, it is to be noted that like parts are designated by like reference numerals throughout the accompanying drawings.

According to a first embodiment of the present invention, in a turning method for machining a workpiece with a cutting tool, there is provided a turning method with reciprocation of a cutting tool comprising: mounting on a table a tool rest having a device for reciprocating the cutting tool in small steps; transferring the table in a direction along a surface to be machined, thereby machining a workpiece; during the transferring and machining process, reciprocating the cutting tool in small steps in the direction along which the table is transferred, by the cutting-tool small-step reciprocating device; and varying chip width by inverting a feed mark (track of the cutting tool on the workpiece) at each one round of the workpiece while the cutting tool is reciprocated in small steps at a frequency m/2 times (where m is any odd number) higher than a rotational speed N (rps) of the workpiece, and breaking a chip at a narrow width thereof. Even when a high ductility material such as iron, nonferrous metals and resins is turned and cut, the method allows an easy breaking of chips, preventing any deterioration of machinability due to entanglement of the chips to the cutting tool, preventing the chips from striking and thereby damaging the machining surface, and further preventing the chip from being sandwiched between a chuck and the workpiece to bring about a mis-chucking, by which the cutting efficiency and the cutting quality are enhanced. Further, the method makes a chip reduced in volume so that the chip will more easily fall onto the chip tray. As a result, the number of times of chip removal is reduced, enhancing the chip disposability, while the possibility that a continuous chip flies out is eliminated, preventing the operator and the turning apparatus from injury and damage, and therefore ensuring a safe turning process.

According to the embodiment of the present invention, in a turning apparatus for machining the rotating workpiece with the cutting tool, there is provided a turning apparatus comprising: the device for reciprocating the cutting tool in small steps; the tool rest equipped with the cutting-tool small-step reciprocating device; the table having those members mounted thereon; and a drive signal generating means for driving the cutting-tool small-step reciprocating device, wherein the cutting tool is reciprocated in small steps in the direction along which the table is moved. Even when a high ductility material such as iron, nonferrous metals and resins is turned and cut, the apparatus allows an easy breaking of chips, preventing any deterioration of machinability due to entanglement of the chips to the cutting tool, preventing the chips from striking and thereby damaging the machining surface, and further preventing the chip from being sandwiched between the chuck and the workpiece to bring about a mis-chucking, by which the cutting efficiency and the cutting quality are enhanced. Further, the apparatus makes a chip reduced in volume so that the chip will more easily fall onto the chip tray. As a result, the number of times of chip removal is reduced, enhancing the chip disposability, while the possibility that a continuous chip flies out is eliminated, preventing the operator and the turning apparatus from injury and damage, and therefore ensuring a safe turning process.

Figure 2:
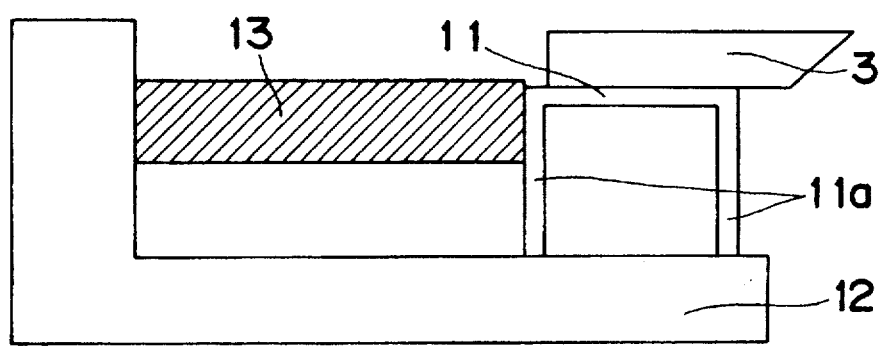
FIG. 2 is a detailed sectional view of the fine feeder of FIG. 1.
Figure 3:
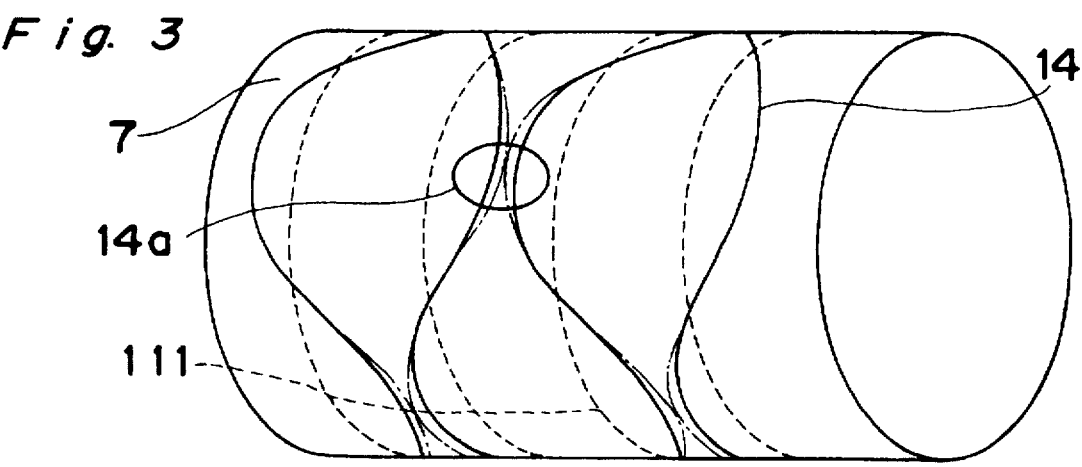
FIG. 3 is a schematic view of a feed mark in the processing of the workpiece by the chip-broken turning apparatus in FIG. 1.

FIGS. 1 to 3 are used below upon a first embodiment of the present invention.

FIG. 1 shows a chip-broken turning apparatus according to the embodiment of the present invention. Reference numeral 1 denotes an NC turning apparatus; 2 denotes a spindle; 3 denotes a cutting tool; 4 denotes an NC table; 5 denotes a control unit for controlling the NC table 4 and the NC turning apparatus 1. Numeral 6 denotes a chuck provided on the spindle 2, the chuck 6 holding the workpiece 7.

Numeral 8 denotes a drive signal generating means, which generates a signal for periodically actuating a fine feeder 9. The cutting tool 3 is fixed to this fine feeder 9, and the fine feeder 9 in turn is fixed to the NC table 4. Numeral 10, which is expressly given to show the conjunction of signals among individual components, can better be understood when regarded as ordinary electrical wiring. FIG. 2 is a detailed sectional view of the fine feeder 9 employed in FIG. 1, where the cutting tool 3 is fixed to a fine feed plate 11. The fine feed plate 11 is provided with spring portions 11a, end portions of which are fixed to a mounting base 12. Denoted by numeral 13 is a piezoelectric element, one side of which is fixed to the mounting base 12 and the other side of which is fixed to the fine feed plate 11. In addition, the mounting base 12 is fixed to the NC table 4 by means which is not shown.

Figure 6:
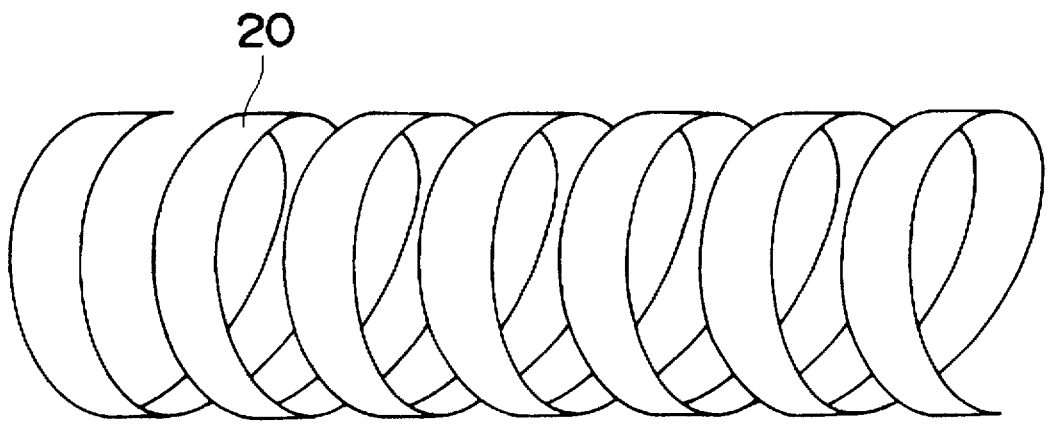
FIG. 6 is a schematic view of a chip that remains continuous and long in the conventional turning method.
Figure 7:
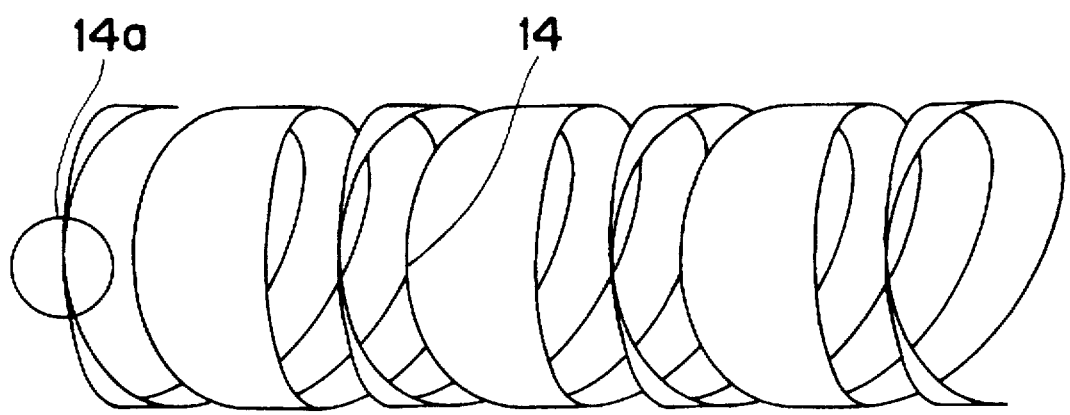
FIG. 7 is a schematic view of a chip configuration including narrow width portions (or feed mark crossing portions) and wide width portions in the chip-broken turning method according to the present embodiment.

The chip-broken turning apparatus with the above constitution is described on its operation below. For comparison's sake, a case where the apparatus carries out machining as an ordinary turning apparatus would do is first explained. The spindle 2 is rotated so that the workpiece 7 held by the chuck 6 provided at an end portion of the spindle 2 is rotated. Then, the NC table 4 and the fine feeder 9 as well as the cutting tool 3 are moved in the direction of an arrow A according to the extent to which the workpiece 7 is to be machined, and stopped at a machining start point. Then, while the cutting tool 3 is reciprocated in small steps, the NC table 4 is transferred in the B direction by the control unit 5, where the outer peripheral surface of the workpiece 7 is turned and cut by the cutting tool 3 during the transfer. The feed mark (the track of the cutting tool 3 on the workpiece 7) in this process can be schematically expressed as shown by broken lines in FIG. 3. This is a track that draws a spiral-like curve with respect to the outer peripheral surface of the workpiece 7, in which case the chip remains long. The resulting chip 20 remaining continuous and long by the ordinary turning process is schematically shown in FIG. 6.

Next, a case is explained where the chip-broken turning according to the embodiment is carried out. First, as in the case of ordinary turning apparatuses, the spindle 2 is rotated so that the workpiece 7 held by the chuck 6 provided at the end portion of the spindle 2 is rotated. Then, the NC table 4 and the fine feeder 9 as well as the cutting tool 3 are moved in the direction of the arrow A according to the extent to which the workpiece 7 is to be machined, and stopped at a machining start point.

Figure 4:
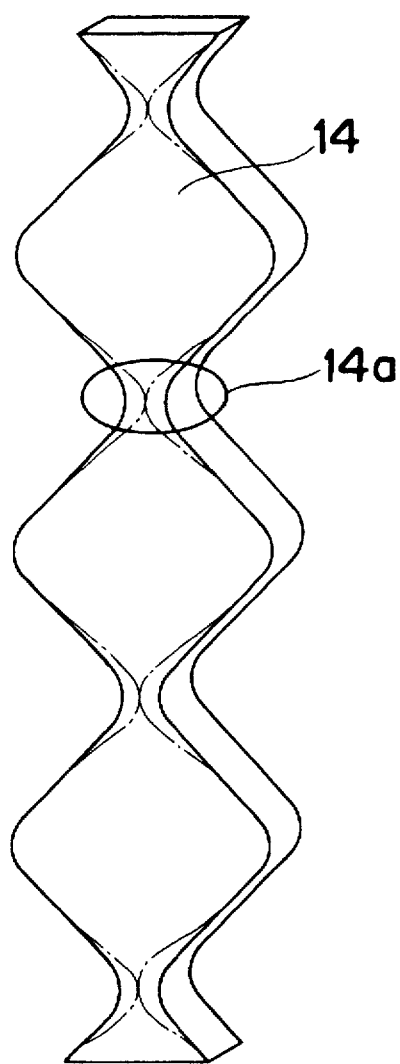
FIG. 4 is a schematic view of a chip configuration including narrow width portions (or feed mark crossing portions) and wide width portions.

Unlike the conventional case from now on, a sine curve signal is generated at a frequency m/2 times (where m is any odd number) higher than the rotational speed N (rps) of the spindle 2, by the drive signal generating means 8. Responsive to this, the fine feeder 9 is also reciprocated in small steps in the direction of C. As a result, the cutting tool 3 is reciprocated in small steps in the C direction, i.e., in the direction along which the cutting tool 3 is fed. Then, while the cutting tool 3 is reciprocated in small steps, the NC table 4 is transferred in the B direction by the control unit 5, where the outer peripheral surface of the workpiece 7 is turned and cut by the cutting tool 3 during the transfer. The feed mark (the track of the cutting tool 3 on the workpiece 7) in this process can be schematically expressed as shown by a broken line in FIG. 3. Whereas the feed mark 111 of the cutting tool 3 has resulted in a track that draws a spiral-like curve with respect to the outer peripheral surface of the workpiece 7 in the case where the cutting tool 3 is not reciprocated in small steps, the solid line that draws a sine curve about the broken line in the feed direction of the cutting tool 3 represents the feed mark 14 of the cutting tool 3 that is reciprocated in small steps. Because the drive signal generating means 8 generates a waveform at a frequency m/2 times (where m is any odd number) higher than the rotational speed of the spindle 2, the feed mark 14 is inverted each time the workpiece 7 makes one round. Accordingly, on the outer peripheral surface of the workpiece 7, there will appear portions 14a where the interval of the feed mark 14 is narrowed and portions where the interval of the feed mark 14 is widened, cyclically. A schematic drawing of a chip configuration including narrow width portions and wide width portions is shown by solid lines in FIG. 4. In the portion 14a where the interval of the feed mark is narrow, stress will be concentrated when the chip is generated, such that the chip will be bent. When the amplitude of the drive signal generating means 8 is enlarged so that the feed mark 14 crosses itself as shown by chain lines in FIGS. 3 and 4, the cutting tool 3 will pass the portion that has already been cut, so that a chip will not be generated, where the chip is broken at that point. After the machining, the cutting tool 3 is separated from the workpiece 7, the drive signal generating means 8 is stopped from generating the sine curve signal, and then the NC table 4 is returned to the origin.

Therefore, even when a high ductility material such as iron, nonferrous metals and resins is turned and cut, the method and apparatus allow an easy breaking of chips, preventing any deterioration of machinability due to entanglement of the chips to the cutting tool, preventing the chips from striking and thereby damaging the machining surface, and further preventing the chip from being sandwiched between the chuck and the workpiece to bring about a mis-chucking, by which the cutting efficiency and the cutting quality are enhanced. Further, the method and apparatus make a chip reduced in volume so that the chip will more easily fall onto the chip tray. As a result, the number of times of chip removal is reduced, enhancing the chip disposability, while the possibility that a continuous chip flies out is eliminated, preventing the operator and the turning apparatus from injury and damage, and therefore ensuring a safe turning process.

According to a second embodiment of the present invention, in a turning method of machining a workpiece with a cutting tool, there is provided a chip-broken turning method comprising: mounting on the table the tool rest having the device for reciprocating the cutting tool in small steps; transferring the table in a direction along a surface to be machined, thereby machining a workpiece; during the transferring and machining process, reciprocating the cutting tool in small steps in the direction along which the table is transferred by the cutting-tool small-step reciprocating device; and varying chip width by inverting a feed mark (a track of the cutting tool on the workpiece) at each one round of the workpiece while the cutting tool is reciprocated in small steps at a frequency m/2 times (where m is any odd number) higher than a rotational speed N (rps) of the workpiece, and breaking a chip at a narrow width thereof, wherein the cutting tool used is one having a flattened cutting edge so that surface roughness and roundness are improved. Even when a high ductility material such as iron, nonferrous metals and resins is turned and cut, the method allows an easy breaking of chips, preventing any deterioration of machinability due to entanglement of the chips to the cutting tool, preventing the chips from striking and thereby damaging the machining surface, and further preventing the chip from being sandwiched between the chuck and the workpiece to bring about a mis-chucking, by which the cutting efficiency and the cutting quality are enhanced. Further, the method makes a chip reduced in volume so that the chip will more easily fall onto the chip tray. As a result, the number of times of chip removal is reduced, enhancing the chip disposability, while the possibility that a continuous chip flies out is eliminated, preventing the operator and the turning apparatus from injury and damage, and therefore ensuring a turning process of enhanced safety and improved surface roughness and roundness.

According to the second embodiment of the present invention, in a turning apparatus for machining the rotating workpiece with the cutting tool, there is provided a chip-broken turning apparatus comprising: the device for reciprocating the cutting tool in small steps; the tool rest equipped with the device; the table having those members mounted thereon; and the drive signal generating means for driving the cutting-tool small-step reciprocating device, wherein the cutting tool is reciprocated in small steps in a direction along which the table is moved. Even when a high ductility material such as iron, nonferrous metals and resins is turned and cut, the apparatus allows an easy breaking of chips, preventing any deterioration of machinability due to entanglement of the chips to the cutting tool, preventing the chips from striking and thereby damaging the machining surface, and further preventing the chip from being sandwiched between the chuck and the workpiece to bring about a mis-chucking, by which the cutting efficiency and the cutting quality are enhanced. Further, the apparatus makes a chip reduced in volume so that the chip will more easily fall onto the chip tray. As a result, the number of times of chip removal is reduced, enhancing the chip disposability, while the possibility that a continuous chip flies out is eliminated, preventing the operator and the turning apparatus from injury and damage, and therefore ensuring a turning process of enhanced safety and improved surface roughness and roundness.

The second embodiment of the present invention is described below by referring to FIGS. 1, 3, and 5. The difference between the first and second embodiments is the configuration of the cutting tool 3.

Figure 5:
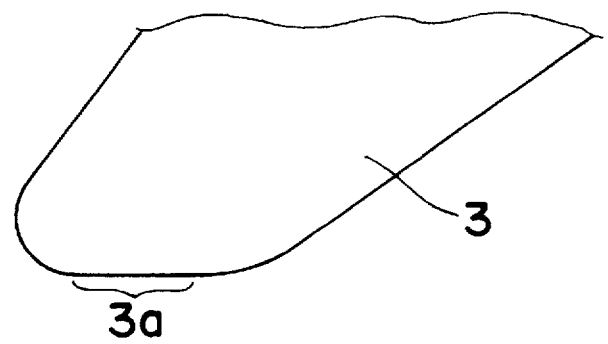
FIG. 5 is a schematic view of the cutting edge shape of the cutting tool of FIG. 1.

FIG. 5 is a schematic view of the cutting edge shape of the cutting tool 3 employed in FIG. 1, showing that a center portion of the edge has been flattened. The cutting tool 3 is fixed to the fine feeder 9 so that this flat portion 3a of the cutting edge becomes parallel to the surface to be machined. The operation of the method is similar to the first embodiment.

Figure 8:
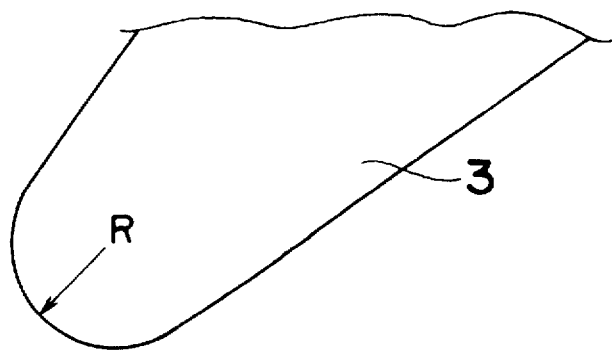
FIG. 8 is a schematic view of a cutting edge shape of a conventional cutting tool.
Figure 9:
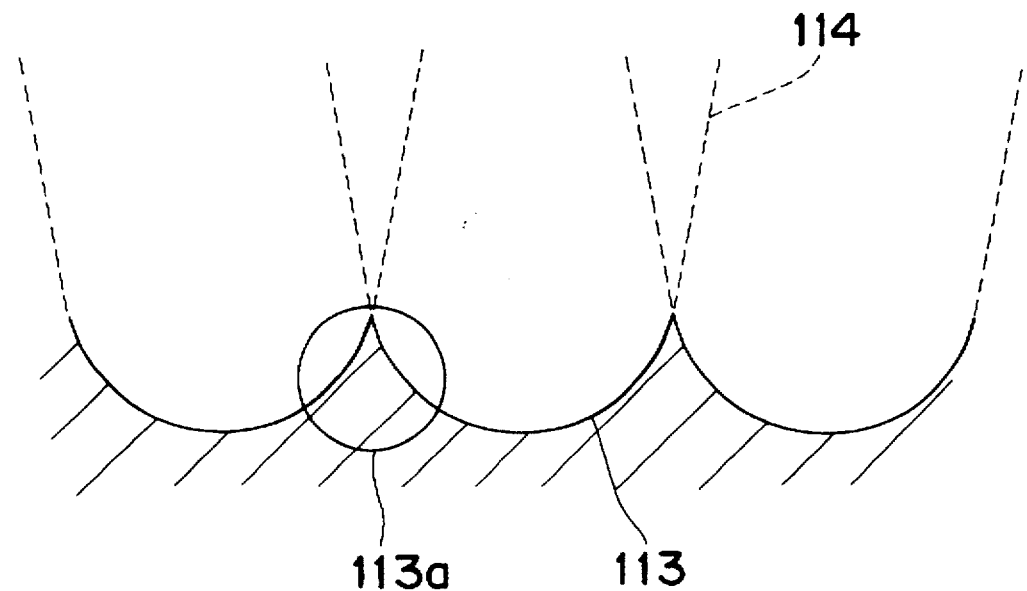
FIG. 9 is a schematic view of a turning-machined cross section of the workpiece by the conventional cutting edge shape.

In this second embodiment, the cutting edge of the cutting tool 3 is flattened. First, shown in FIG. 8 is a shape of the cutting edge that is formed into a circular arc with radius R, which has been most commonly used hitherto. A turning-machined section 113 of a workpiece which has been subjected to the chip-broken turning with the cutting tool having this cutting edge shape is shown by solid line in FIG. 9. For simplified description of various machining conditions, the transferability of the cutting edge shape to the workpiece is assumed to be complete and a position 114 of the cutting edge for each one rotation of the workpiece is shown also by broken line. Although this turning-machined section 113 will vary depending on the radius of the cutting edge and the cutting-tool feed rate (mm/r), the cutting edge shape is necessarily transferred onto the machining surface. Accordingly, the surface roughness and roundness of the machining surface are largely affected by this factor, so that a convex portion 113a of the machining cross section of the workpiece will be a large one. Because the cutting tool 3 is reciprocated in the chip-broken turning process, there are portions where the interval of the feed mark is widened and portions where the interval of the feed mark is narrowed as shown by the feed mark 14 in FIG. 3, where the surface roughness and the roundness are more likely to be poor in those wide interval portions.

Figure 10:
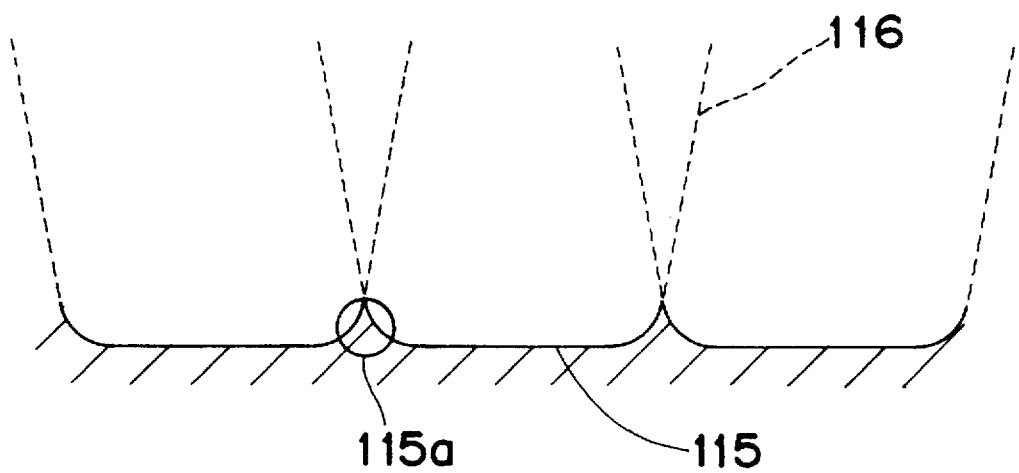
FIG. 10 is a schematic view of a turning-machined cross section of the workpiece in the case where the cutting edge is shaped into a flat surface in the preferred second embodiment.

A turning-machined section 115 of the workpiece in the case where the cutting edge of the cutting tool 3 is flattened in this second embodiment is shown by solid line in FIG. 10. A position 116 of the cutting edge for each one rotation of the workpiece is shown also by broken line. Because of the flattened cutting edge, even if the cutting edge shape is transferred to the machining surface, a convex portion 115a of the machining cross section of the workpiece is a small one. Furthermore, when the flat portion 3a of the cutting edge of the cutting tool 3 is made larger, the convex portion 115a can almost be eliminated, given a complete transferability of the cutting edge shape to the workpiece.

After the machining, the cutting tool 3 is separated from the workpiece 7, the drive signal generating means 8 is stopped from generating the sine curve signal, and then the NC table 4 is returned to the origin.

Therefore, even when a high ductility material such as iron, nonferrous metals and resins is turned and cut, the method and apparatus allow an easy breaking of chips, preventing any deterioration of machinability due to entanglement of the chips to the cutting tool, preventing the chips from striking and thereby damaging the machining surface, and further preventing the chip from being sandwiched between the chuck and the workpiece to bring about a mis-chucking, by which the cutting efficiency and the cutting quality are enhanced. Further, the method and apparatus make a chip reduced in volume so that the chip will more easily fall onto the chip tray. As a result, the number of times of chip removal is reduced, enhancing the chip disposability, while the possibility that a continuous chip flies out is eliminated, preventing the operator and the turning apparatus from injury and damage, and therefore ensuring a turning process of enhanced safety and improved high surface roughness and roundness.

One example of the processing condition is as follows: the number of revolutions of the spindle is 5040 rpm (84 Hz), the feed rate of the cutting tool is 50 μm/one revolution, the frequency of the vibration (reciprocation in small steps) is 210 Hz (five cuts per two revolutions), the amplitude is 50 μm, and the material of the workpiece is The Aluminum Association No. 6061 (Brinell hardness is 62–65). It is preferable to surely cut the chip at the track crossing portion that the amplitude is equal to or larger than the feed rate of the cutting tool.

The chip-broken effect of the embodiment is specifically preferred to a material having the Brinell hardness of 70 or less which is The Aluminum Association (in U.S.A.) No. 6061 or The Japanese Industrial Standards No. A6061: 0.4–0.8% of Si, 0.7% of Fe, 0.15–0.4% of Cu, 0.15 of Mn, 0.8–1.2 of Mg, 0.04–0.35 of Cr, 0.25 of Zn, 0.15 of Ti in weight.

Another example of the processing conditions and their results are shown in Table 1 when the feed rate of the table is varied with the vibration (reciprocation in small steps) of the cutting tool stopped which is equal to a condition where the vibration of the cutting tool is varied with the table feed rate of zero.

TABLE 1

| feed rate (mm/rev.) | frequency (Hz) | amplitude (μm) | chip length (mm) | upper roundness | lower roundness | surface roughness |
| --- | --- | --- | --- | --- | --- | --- |
| 0.03 | 250 | 30 | 4 | 0.7 | 2.6 | 0.9 |
| 0.02 | 250 | 30 | 3 | 0.6 | 2.1 | 0.9 |
| 0.01 | 250 | 30 | 3 | 0.4 | 1.5 | 0.3 |
| 0.02 | 250 | 20 | 3 | 0.5 | 1.8 | 0.5 |
| 0.01 | 250 | 20 | 2 | 0.6 | 1.4 | 0.2 |

Figure 11:
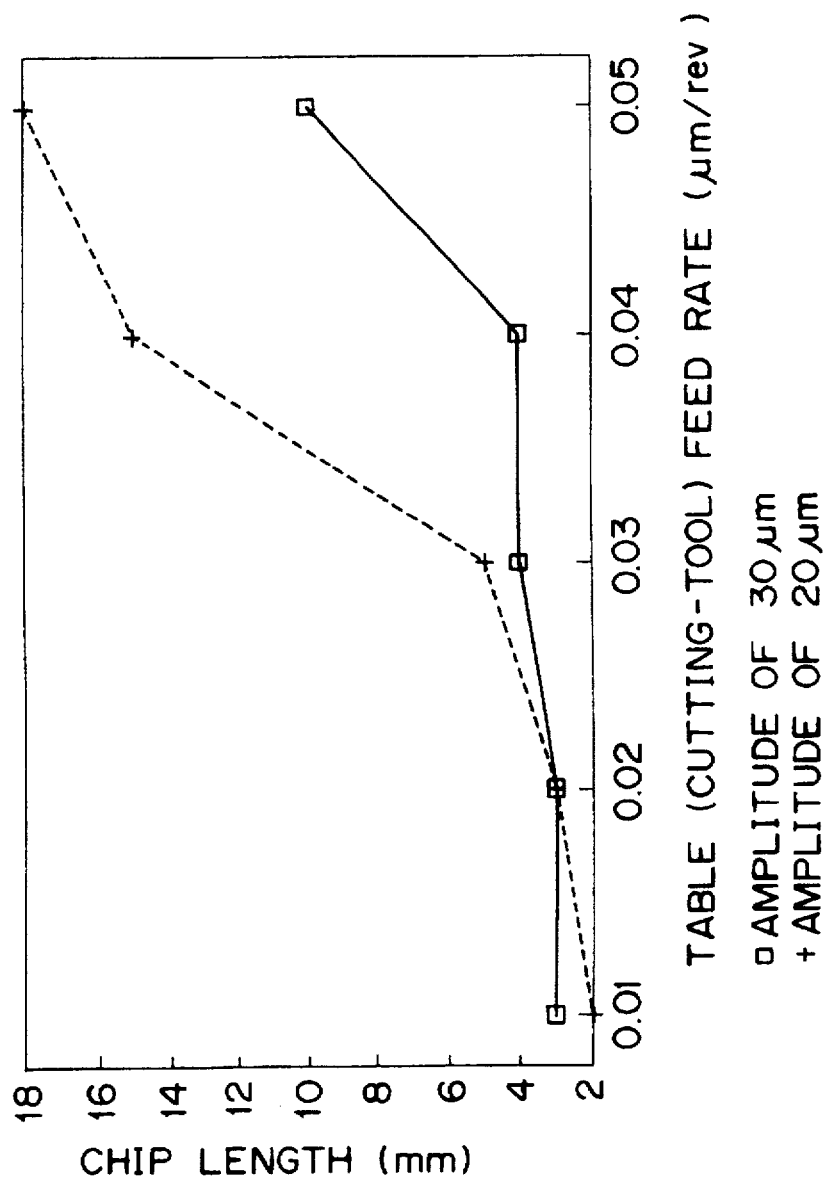
FIG. 11 is a graph showing a relationship between an optimum processing condition and a chip length.

FIG. 11 is a graph showing a relationship between an optimum processing condition and a chip length, i.e. between a table (cutting tool) feed rate and the chip length. In FIG. 11, the squares show the amplitude of 30 μm and the plus signs show the amplitude of 20 μm. In this graph, when the feed rate is 0.04 μm/one revolution, the chip length at the amplitude of 30 μm is 4 mm but the chip length at the amplitude of 20 μm is 15 mm which is too long.

Examples of the relationship between the deviation of the cutting tool and the rotary angle of the workpiece are shown in FIGS. 12–16.

Figure 12:
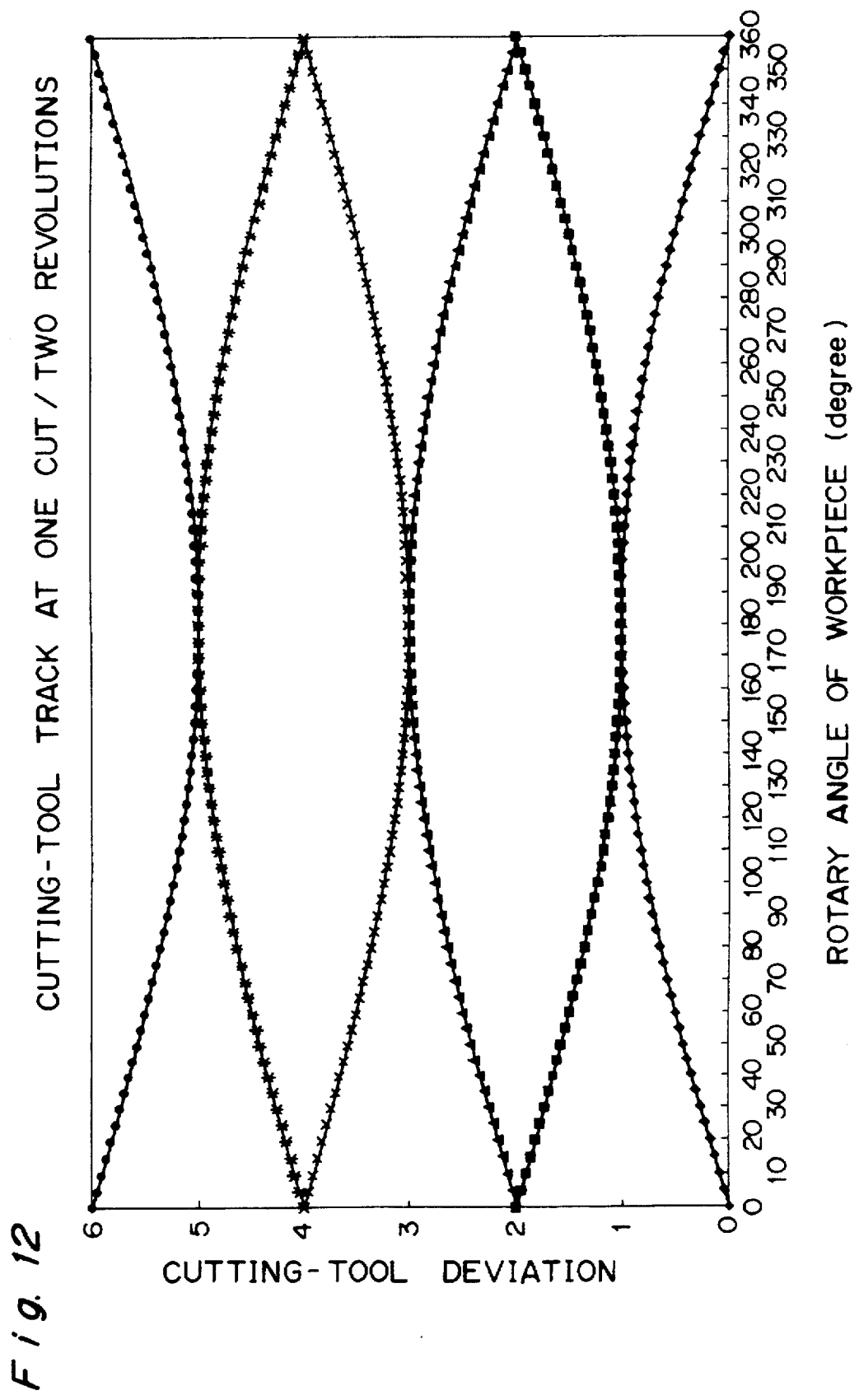
FIG. 12 is a graph showing a track of the cutting tool at one cut/two revolutions according to the embodiment of the present invention.

That is, FIG. 12 is a graph showing a track of the cutting tool at one cut/two revolutions according to the embodiment of the present invention where the chip is cut by one time during two revolutions of the workpiece.

Figure 13:
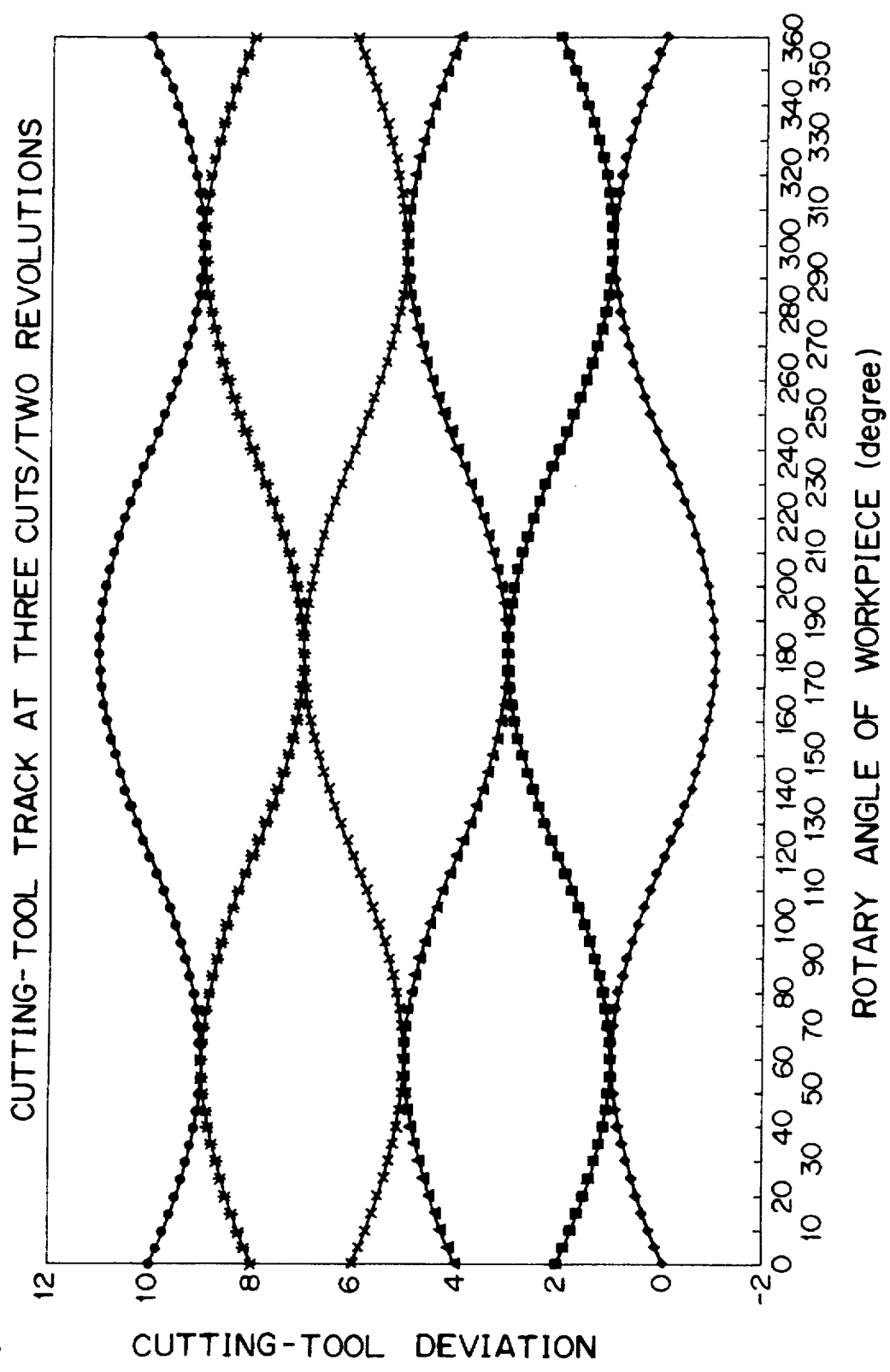
FIG. 13 is a graph showing a track of the cutting tool at three cuts/two revolutions according to the embodiment of the present invention.

FIG. 13 is a graph showing a track of the cutting tool at three cuts/two revolutions according to the embodiment of the present invention where the chip is cut by three times during two revolutions of the workpiece.

Figure 14:
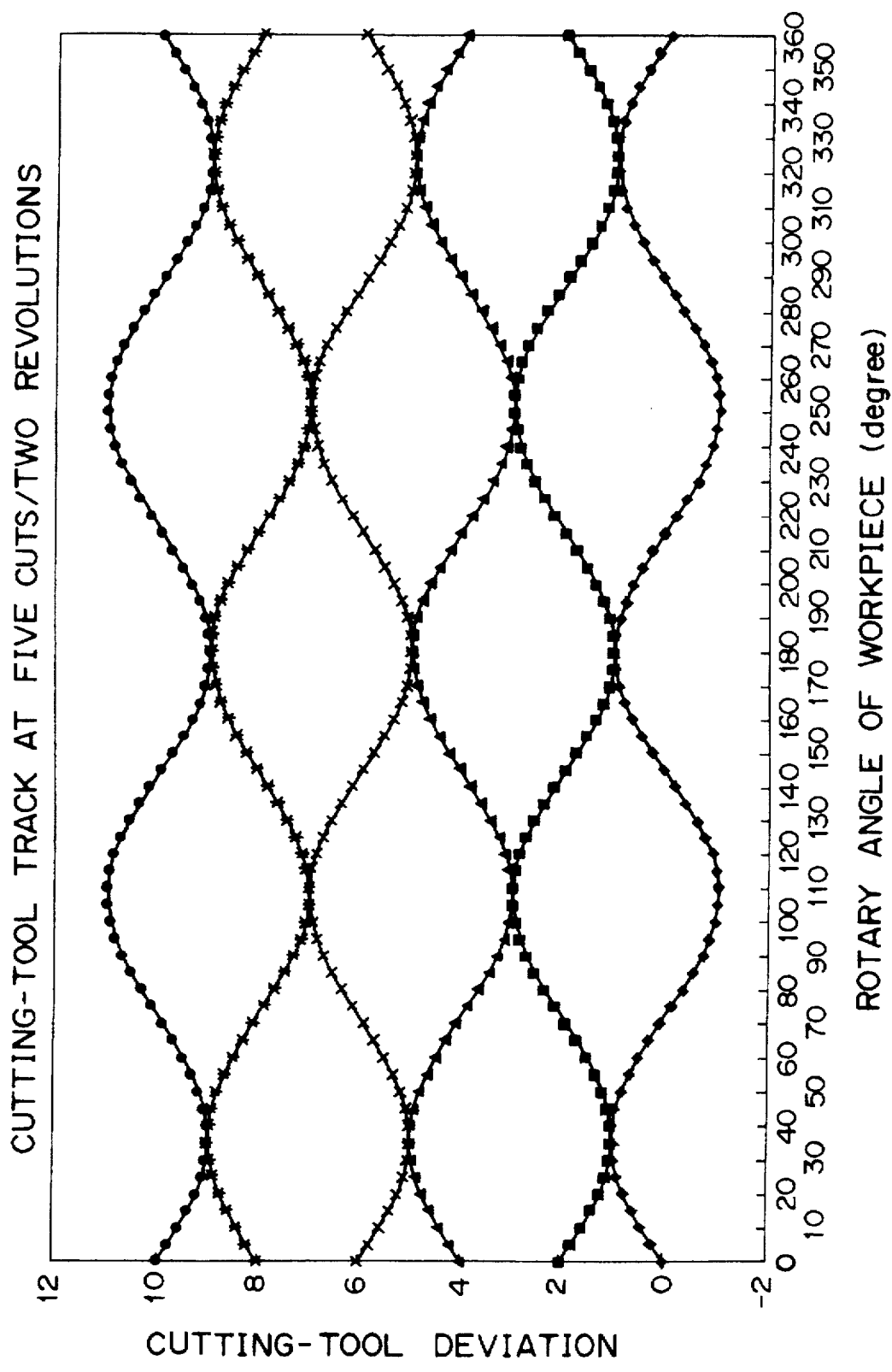
FIG. 14 is a graph showing a track of the cutting tool at five cuts/two revolutions according to the embodiment of the present invention.

FIG. 14 is a graph showing a track of the cutting tool at five cuts/two revolutions according to the embodiment of the present invention where the chip is cut by five times during two revolutions of the workpiece.

Figure 15:
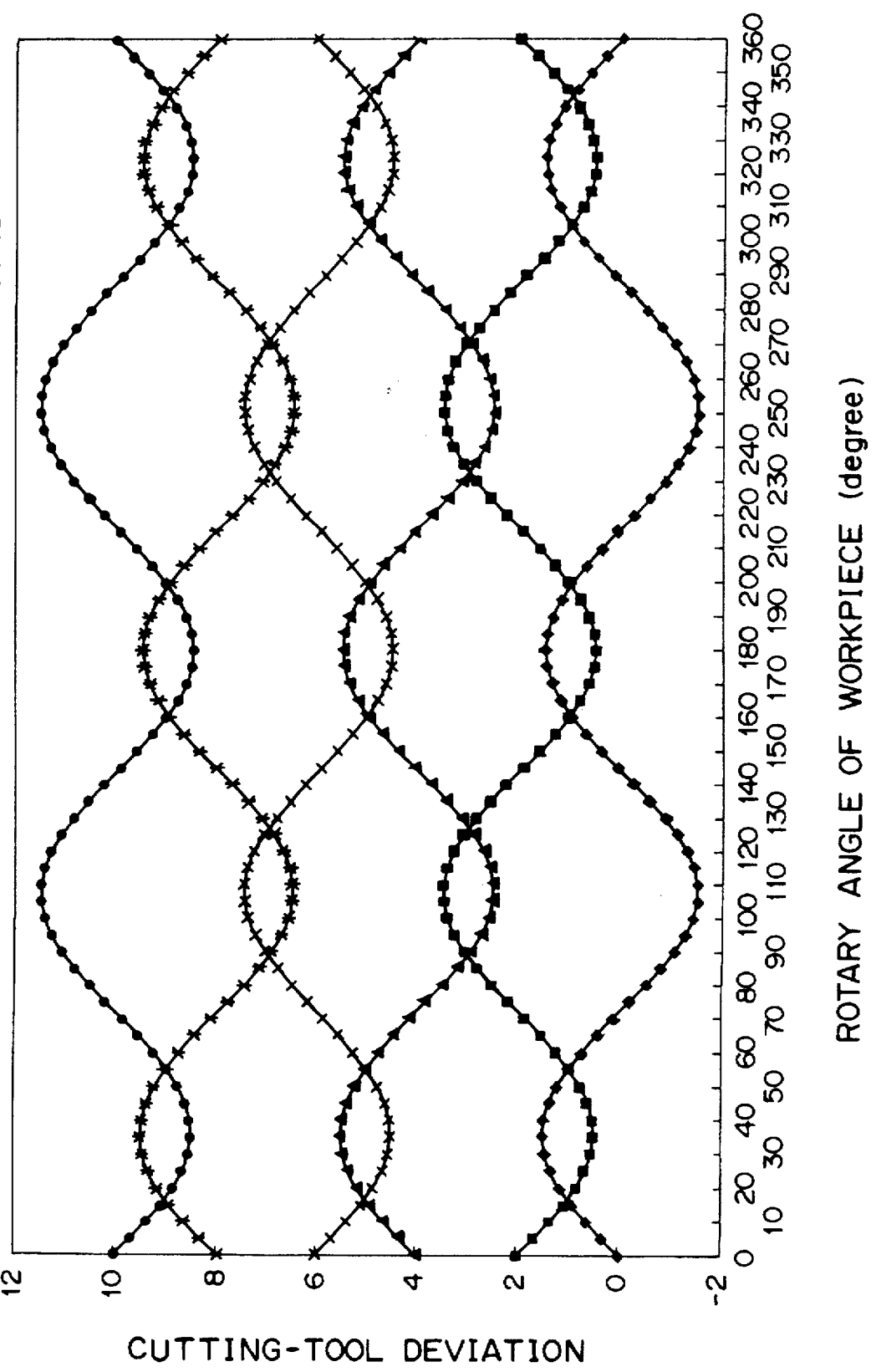
FIG. 15 is a graph showing a track of the cutting tool at ten cuts/two revolutions according to the embodiment of the present invention where the deviation of the cutting tool is 1.5 times the feed rate of the table.

FIG. 15 is a graph showing a track of the cutting tool at ten cuts/two revolutions according to the embodiment of the present invention where the deviation of the cutting tool is 1.5 times the feed rate of the table and where the chip is cut by ten times during two revolutions of the workpiece.

Figure 16:
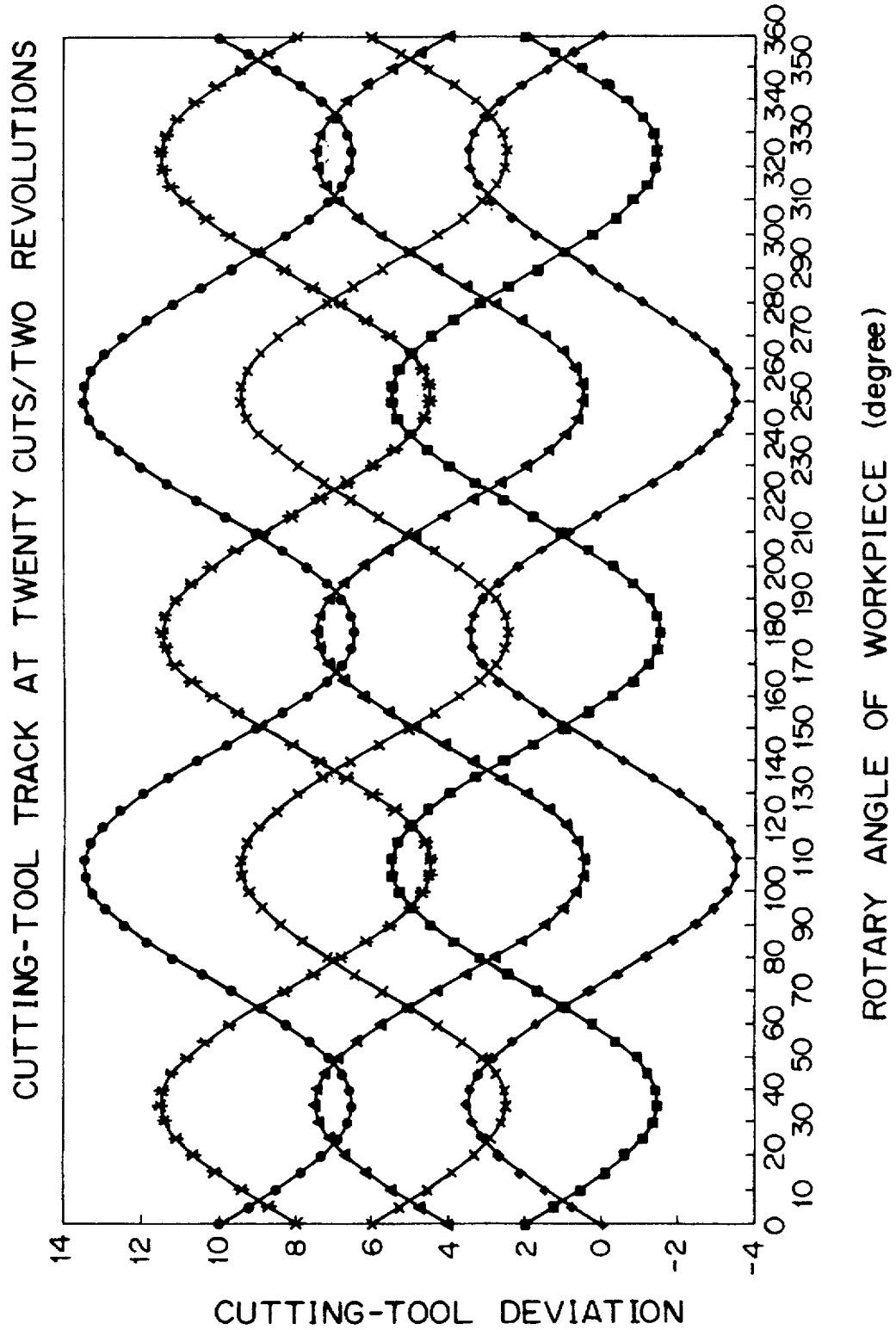
FIG. 16 is a graph showing a track of the cutting tool at twenty cuts/two revolutions according to the embodiment of the present invention where the deviation of the cutting tool is 3.5 times the feed rate of the table.
Figure 17:
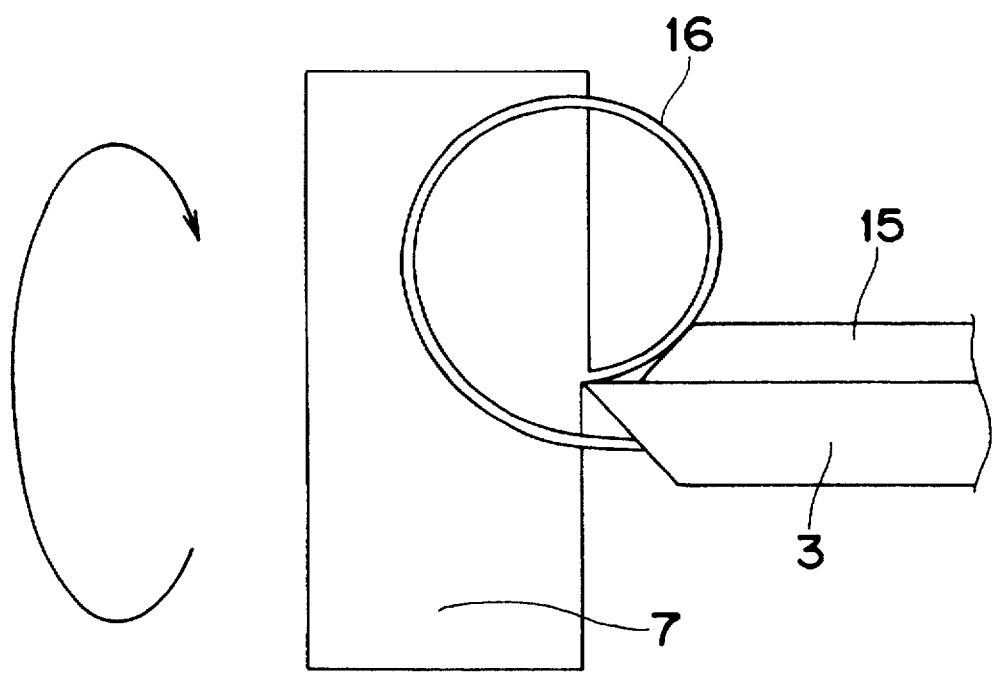
FIG. 17 is a schematic view of the turning process by a conventional cutting tool with a chip breaker.

FIG. 16 is a graph showing a track of the cutting tool at twenty cuts/two revolutions according to the embodiment of the present invention where the deviation of the cutting tool is 3.5 times the feed rate of the table and where the chip is cut by twenty times during two revolutions of the workpiece.

In the above embodiments, the waveform generated by the drive signal generating means 8 has been a sine curve. However, the waveform may also be some other one, such as triangular waves, rectangular waves, trapezoidal waves and sawtooth waves, which causes the concentration of stress or the overlapping of the feed mark to take place periodically during the generation of a chip.

Also, the fine feeder 9 is not limited to those employing a piezoelectric element or a fine feed plate or the like, as in the above embodiments, and may be a linear motor, a hydraulic cylinder or the like, irrespectively of its concrete constitution.

Furthermore, in the above embodiments, the workpiece 7 has been exemplified by one having a cylindrical shape and its outer peripheral surface has been turned and cut. However, its configuration and its surface to be machined are not limitative. For example, a conical surface of a conical workpiece or the like may be machined. The point is that the cutting tool is reciprocated in small steps along the direction in which the cutting tool is fed.

Still further, although the cutting edge of the cutting tool 3 has been made a flat shape in the above second embodiment, its shape is not necessarily limited to a complete flat surface, and the flat surface may be other than parallel to the axial direction of the spindle 2 within the scope intended for the present invention. For instance, the cutting edge may be shaped into a cylindrical surface or conical surface parallel to the axial direction of the spindle 2. The point is that the turning-machined cross section of the workpiece has a linear portion along the axial direction so that the convex portion will be a small one.

Otherwise, the arrangement of the components such as the configuration of the turning apparatus is arbitrarily changeable in design within the scope intended for the present invention.

As described above, according to the present invention, chips are broken into short pieces so that the cutting efficiency and the cutting quality can be improved, chip disposal can be facilitated, and that a safe turning process can be achieved, instead of the conventional machining method in which chips of the workpiece are so long as to be entangled with the cutting tool, workpiece and chuck, causing damage of the machining surface or deterioration of machinability or mis-chucking.

As described above, according to the present invention, chips are broken into short pieces so that the cutting efficiency and the cutting quality can be improved, chip disposal can be facilitated, and that a turning process of safety and good surface roughness and roundness can be achieved, instead of the conventional machining method.

The entire disclosure of Japanese Patent Applications No. 8-33351 filed on Feb. 21, 1996 and No. 8-206787 filed on Aug. 6, 1996, including specifications, claims, drawings, and summaries are incorporated herein by reference in their entireties.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. In a turning method for machining a workpiece with a cutting tool, a turning method with reciprocation of a cutting tool comprising:

transferring a table on which a cutting tool is mounted, in a direction along a surface to be machined, thereby machining a workpiece;

during the transferring and machining process, reciprocating the cutting tool in small steps in the direction along which the table is transferred; and varying a chip width of a chip by inverting a feed mark at each one round of the workpiece while the cutting tool is reciprocated in the small steps at a frequency m/2 times (where m is any odd number) higher than a rotational speed N (rps) of the workpiece, so that the feed mark crosses itself and thus the cutting tool will pass a portion that has already been cut to break the chip at the portion.

2. A turning method as defined in claim 1, wherein the cutting tool has a flattened cutting edge.

3. In a turning method for machining a workpiece with a cutting tool, a turning method with reciprocation of a cutting tool comprising:

transferring a table on which a cutting tool is mounted, in a direction along a surface to be machined, thereby machining a workpiece;

during the transferring and machining process, reciprocating the cutting tool in small steps in the direction along which the table is transferred; and varying a chip width of a chip by inverting a feed mark at each one round of the workpiece while the cutting tool is reciprocated in the small steps at a frequency m/2 times (where m is any odd number) higher than a rotational speed N (rps) of the workpiece, and breaking a chip at a feed mark crossing portion thereof, wherein the cutting tool used is one having a flattened cutting edge.

4. A turning method as defined in claim 3, wherein in varying the chip width, the feed mark crosses itself and thus the cutting tool will pass a portion that has already been cut to break the chip at the portion.

5. In a turning apparatus for machining a rotating workpiece with a cutting tool, a turning apparatus comprising:

a device for reciprocating a cutting tool in small steps with respect to a workpiece;

a movable table on which the cutting-tool small-step reciprocating device is mounted; and a drive signal generating means for driving the cutting-tool small-step reciprocating device to reciprocate the cutting tool in small steps in a direction along which the table is moved so as to vary a chip width of a chip by inverting a feed mark at each one round of the workpiece while the cutting tool is reciprocated in the small steps at a frequency m/2 times (where m is any odd number) higher than a rotational speed N (rps) of the workpiece, so that the feed mark crosses itself and thus the cutting tool will pass a portion that has already been cut to break the chip at the portion.

6. A turning apparatus as defined in claim 5, wherein the cutting tool has a flattened cutting edge.

7. In a turning apparatus for machining a rotating workpiece with a cutting tool, a turning apparatus comprising:

a device for reciprocating a cutting tool in small steps with respect to a workpiece;

a movable table on which the cutting-tool small-step reciprocating device is mounted; and a drive signal generating means for driving the cutting-tool small-step reciprocating device to reciprocate the cutting tool in small steps in a direction along which the table is moved, wherein the cutting tool has a flattened cutting edge.

8. A turning apparatus as defined in claim 7, wherein the drive signal generating means drives the cutting-tool small-step reciprocating device to reciprocate the cutting tool in small steps in a direction along which the table is moved so as to vary a chip width of a chip by inverting a feed mark at each one round of the workpiece while the cutting tool is reciprocated in the small steps at a frequency m/2 times (where m is any odd number) higher than a rotational speed N (rps) of the workpiece, so that the feed mark crosses itself and thus the cutting tool will pass a portion that has already been cut to break the chip at the portion.

* * * * *